(12) United States Patent
White (10) Patent No.: US 6,848,270 B2
(45) Date of Patent: Feb. 1, 2005

(54) PENDANT POSITIONER

(76) Inventor: James E. White, 4107 Breakwater Dr., Okemos, MI (US) 48864

(*) Notice: Subject to any disclaimer, the term of this patent is extended or adjusted under 35 U.S.C. 154(b) by 293 days.

(21) Appl. No.: 09/773,093

(22) Filed: Jan. 31, 2001

(65) Prior Publication Data

US 2001/0054299 A1 Dec. 27, 2001

Related U.S. Application Data

(60) Provisional application No. 60/179,053, filed on Jan. 31, 2000.

(51) Int. Cl.[7] .............................. A44C 5/00; A44B 1/04
(52) U.S. Cl. .................. 63/3.1; 63/26; 63/23; 63/29.1; 24/131 C
(58) Field of Search .......................... 63/3, 3.2, 21, 23, 63/26, 29.1, 1.18, 1.16, 3.1; 24/128, 131 C (56) References Cited

U.S. PATENT DOCUMENTS

| | | | | |
|---|---|---|---|---|
| 358,397 A | * | 2/1887 | Hurd | 24/131 C |
| 662,171 A | * | 11/1900 | Lederer | 63/21 |
| 794,695 A | * | 7/1905 | Bagnall | 63/21 |
| 1,135,409 A | * | 4/1915 | Simmons | 224/175 |
| 3,094,754 A | * | 6/1963 | Wayne | 24/116 R |
| 3,224,060 A | * | 12/1965 | Harris | 24/116 A |
| 3,250,309 A | * | 5/1966 | Gyllenberg | 152/213 R |
| 3,877,250 A | * | 4/1975 | Musillo | 63/23 |
| 4,292,715 A | * | 10/1981 | Huddon | 24/705 |
| 4,305,262 A | * | 12/1981 | Ferrara | 63/29.1 |
| 4,357,694 A | * | 11/1982 | Montuori | 368/282 |
| 4,413,381 A | * | 11/1983 | Fidock | 24/131 C |
| 4,741,179 A | * | 5/1988 | McConnell, Jr. | 63/13 |
| 5,054,299 A | * | 10/1991 | Maveety | 63/3 |
| 5,195,335 A | * | 3/1993 | Hart | 63/3.2 |
| 5,974,830 A | * | 11/1999 | Colero | 63/26 |
| 6,338,185 B1 | * | 1/2002 | Solterbeck | 24/131 C |
| 6,668,583 B2 | * | 12/2003 | O'Brien | 63/3.1 |
| 2002/0005047 A1 | * | 1/2002 | Beard | 63/3 |

FOREIGN PATENT DOCUMENTS

DE 29811848 U1 * 3/1999

* cited by examiner

*Primary Examiner*—Thomas B. Will
*Assistant Examiner*—Katherine Mitchell (57) ABSTRACT

A device applicable to the positioning of a loose object on a carrier such as a device mounted on a necklace with a pendant to keep the pendant in a stationary position on the necklace. The device comprises at least one coil forming an opening and a locating section. The necklace is contained in the opening of the coil with the locating section serving to retain the pendant in position on the necklace. Optional end configurations serve to reduce risk of necklace entanglement as well as increase friction between the device and the necklace.

20 Claims, 10 Drawing Sheets

PENDANT POSITIONER

CROSS REFERENCES TO RELATED APPLICATIONS

Provisional Application for Patent No. 60/179,053 of Jan. 31, 2000 of the same title, Pendant Positioner, which is hereby incorporated by reference in its entirety and for which Applicant claims priority pursuant to 35 U.S.C. Par. 119 (e)(i).

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to a device applicable to the positioning of a loose object on a carrier such as a positioner for positioning a pendant on a necklace.

2. Background Information

A patent search was run by Mary M. Moyne of Mcleod & Moyne of Okemos, Mich. that uncovered the following prior art patents:

| | | |
|---|---|---|
| 229,257 | King | Jun. 29, 1880 |
| 511,944 | Gordon | Jan. 2, 1894 |
| 1,746,054 | Ridabock | Feb. 4, 1930 |
| 3,094,754 | Wayne | Jun. 25, 1963 |
| 3,122,900 | Beghetto, Jr | Mar. 3, 1964 |
| 5,440,900 | White | Aug. 15, 1995 |
| 5,651,275 | Towne | Jul. 29, 1997 |
| Applicant found other patents: | | |
| 4,551,993 | Nagahori | Nov. 12, 1985 |
| 5,806,346 | Schlinger | Sep. 15, 1998 |

The above patents seem to address the problem of holding a pendant in position on a necklace, but they don't seem to be a simple way to hold a pendant in position on a necklace. As will be seen from the subsequent description, the preferred embodiments of the present invention overcome these and other shortcomings of existing pendant positioners.

SUMMARY OF THE INVENTION

The present invention is a device which is mounted on a carrier with a loose object to keep the loose object in a stationary position on the carrier.

The device, in the preferred embodiment comprises at least one coil, forming an opening, and a locating section.

The carrier is contained within the coil with the locating section serving to retain the loose object in position on the carrier.

Optional end configurations serve to reduce risk of carrier entanglement as well as increase friction between the device and the carrier.

DESCRIPTION OF THE PREFERRED EMBODIMENTS

As shown in FIGS. 1, 1A, 3, 4, 4A, and 5 the preferred embodiment of the present invention is a device for holding a pendant in position on a necklace, a pendant positioner 1 comprising a left hand coil 10 forming a left hand opening 11, a locating section 30, and a right hand coil 20 forming a right hand opening 21.

Figure 2:
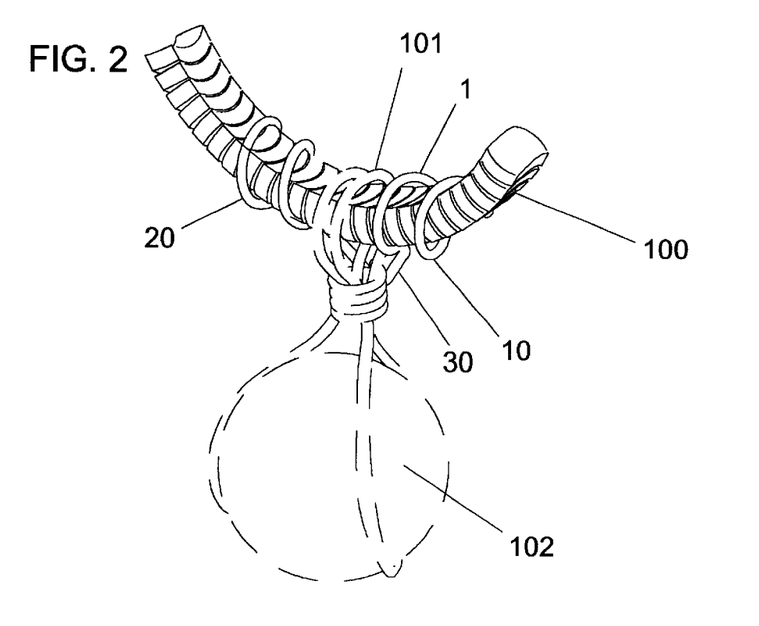
FIGS. 2 and 6 illustrate front and rear views of the preferred embodiment of the present invention installed on a necklace.
Figures 3, 4, 4A:
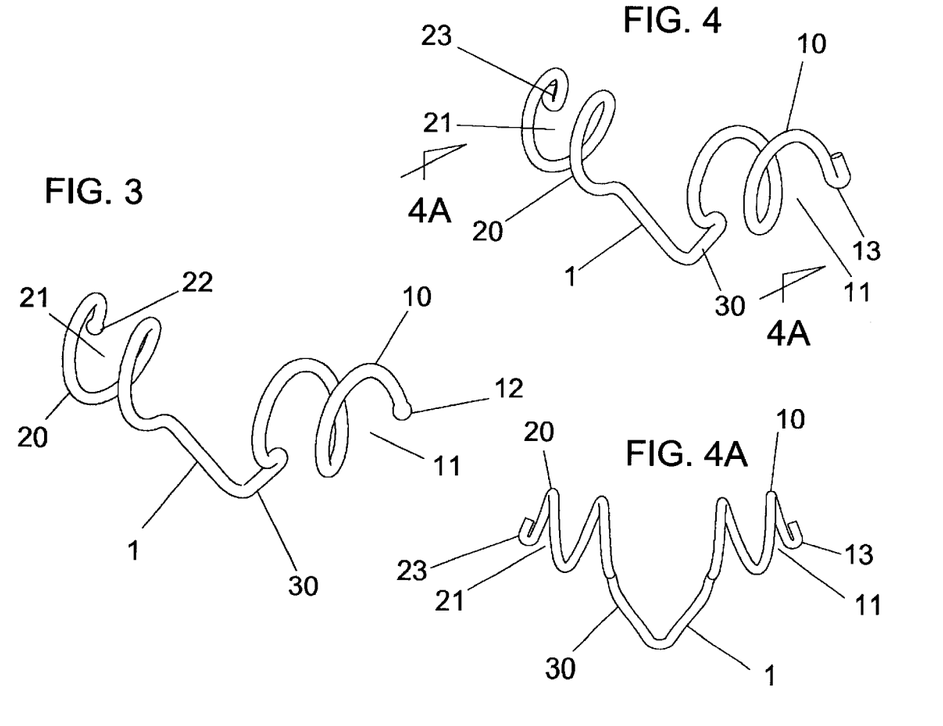
FIGS. 3, 4, 4A, and 5 illustrate the present invention with various ends.

FIG. 3 illustrates the left hand coil 10 with a left hand formed end 12 and the right hand coil 20 with a right hand formed end 22. In the preferred embodiment of the present invention, said formed ends 12 and 22 are of solder. However, as is obvious to anyone skilled in the art, there are other ways of achieving formed ends 12 and 22, such as, but not restricted to, swaging or other forms of metal deformation. Said formed ends 12 and 22 are optional and serve to reduce risk of entanglement of the pendant positioner 1 and a prior art necklace 100 (Ref. FIG. 2) as well as increase friction between the necklace 100 and the pendant positioner 1.

Figure 5:
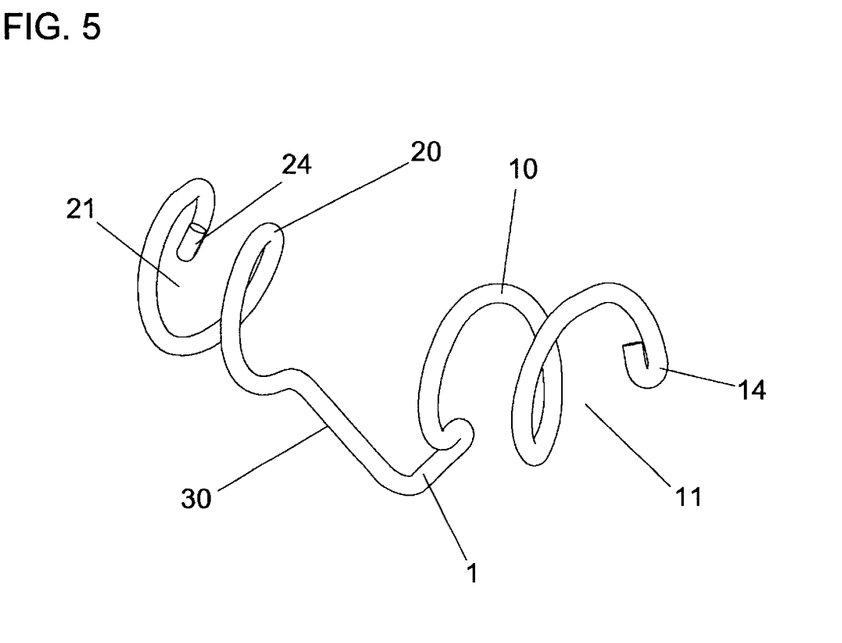

FIGS. 4 and 4A illustrate the left hand coil 10 with a left hand version one bent end 13 and the right hand coil 20 with a right hand version one bent end 23, FIG. 5 illustrates the left hand coil 10 with a left hand version two bent end 14 and the right hand coil 20 with a right hand version two bent end 24.

Figure 6:
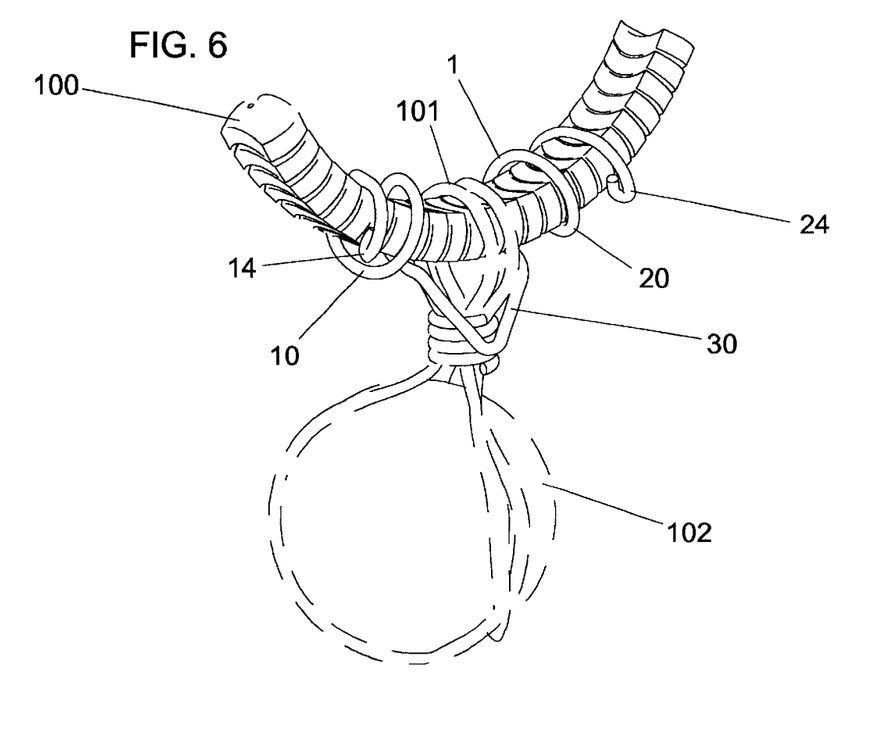

FIGS. 2 and 6 illustrate the pendant positioner 1 installed on the prior art necklace 100. Said necklace 100 is contained in said coils 10 and 20 with the locating section 30 behind a type one bail 101 of a type one pendant 102. The locating section 30 in conjunction with said coils 10 and 20 serve to retain said pendant 102 in position on said necklace 100. FIG. 2 is a front view while FIG. 6 is a rear view.

FIG. 6 illustrates the left hand coil 10 with a left hand version two bent end 14 and the right hand coil 20 with a right hand version two bent end 24. Said bent ends 14 and 24 are perpendicular to said necklace 100. Said bent ends 13 and 23, shown in FIG. 4, would be parallel to said necklace 100 shown in FIG. 6.

Figure 7:
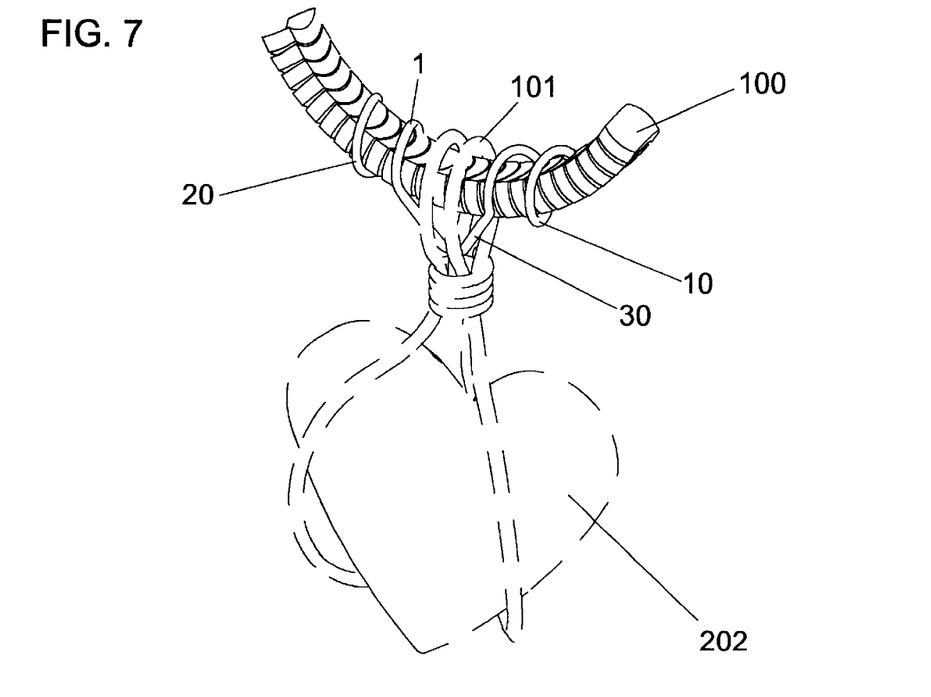
FIG. 7 illustrates the preferred embodiment of the present invention in a different installation than shown in FIGS. 2 and 6.

FIG. 7 illustrates the pendant positioner 1 installed on said necklace 100 wherein the locating section 30 is within the type one bail 101 of a type two pendant 202. As illustrated also in FIGS. 2 and 6, said necklace 100 is contained in said coils 10 and 20.

The locating section 30 through said bail 101, in conjunction with said coils 10 and 20, serve to retain said pendant 202 in position on said necklace 100.

Figure 8:
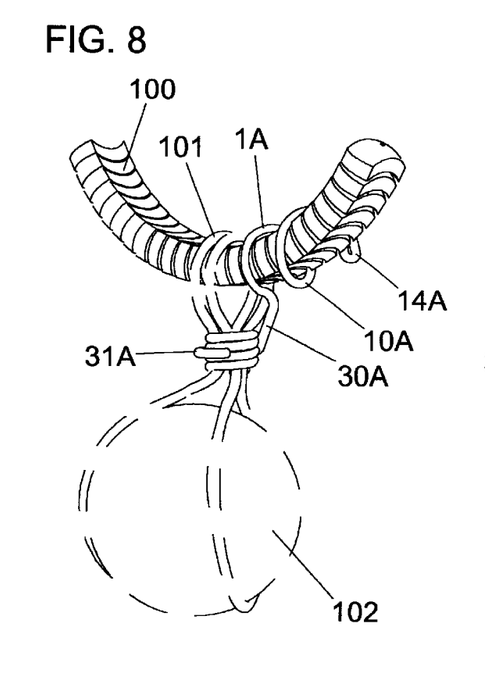
FIG. 8 illustrates an alternate embodiment of the present invention installed on a necklace.
Figure 9:
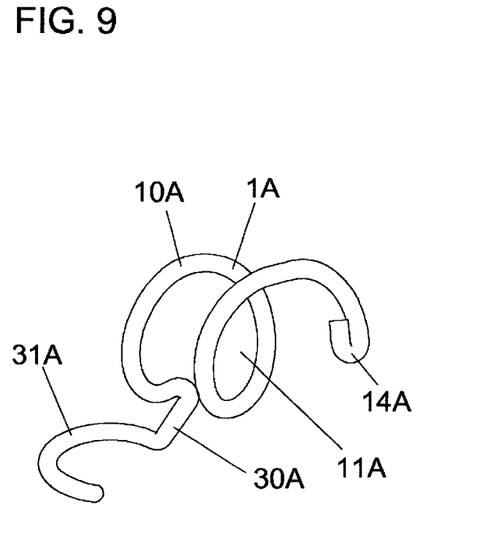
FIG. 9 illustrates the alternate embodiment of the present invention.

Referring to FIGS. 8 and 9, an alternate embodiment pendant positioner 1A comprises an alternate coil 10A, with an alternate bent end 14A, forming an alternate opening 11A, and an alternate locating section 30A, and an alternate locating loop 31A.

In FIG. 8 said pendant positioner 1A is shown installed on said necklace 100 wherein said necklace 100 is contained within the alternate coil 10A and the locating loop 31A which, in conjunction with said locating section 30A, engages said bail 101 of said pendant 102 and serves to retain said pendant 102 in position on said necklace 100.

Figure 10:
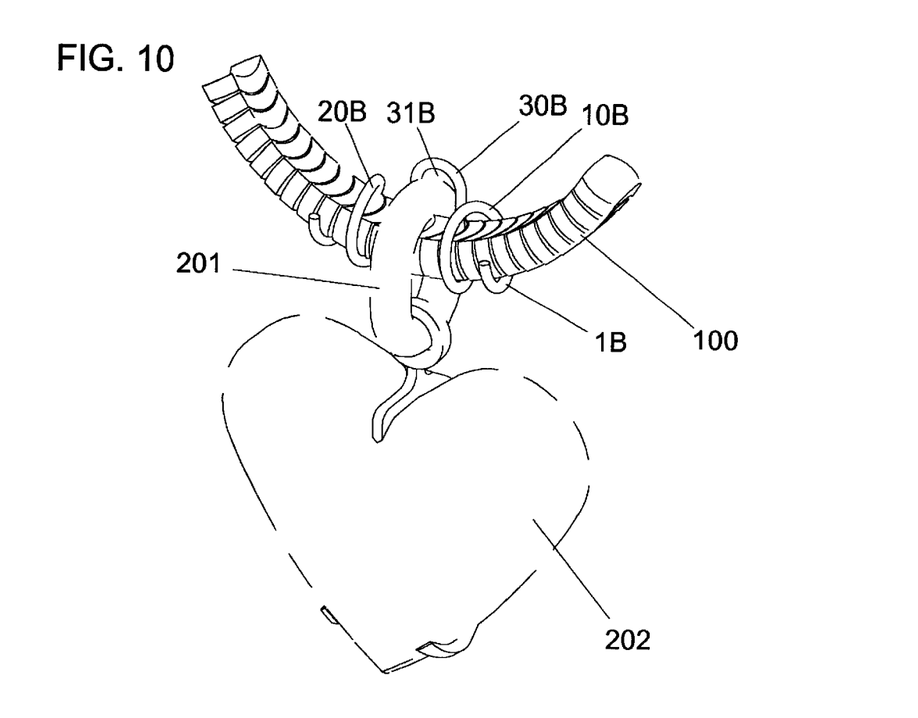
FIG. 10 illustrates a second alternate embodiment of the present invention installed on a necklace.
Figure 11:
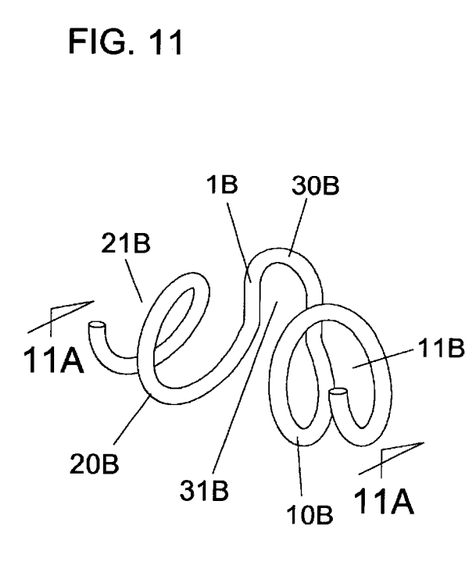
FIGS. 11 and 11A illustrate the second alternate embodiment of the present invention.
Figure 11A:
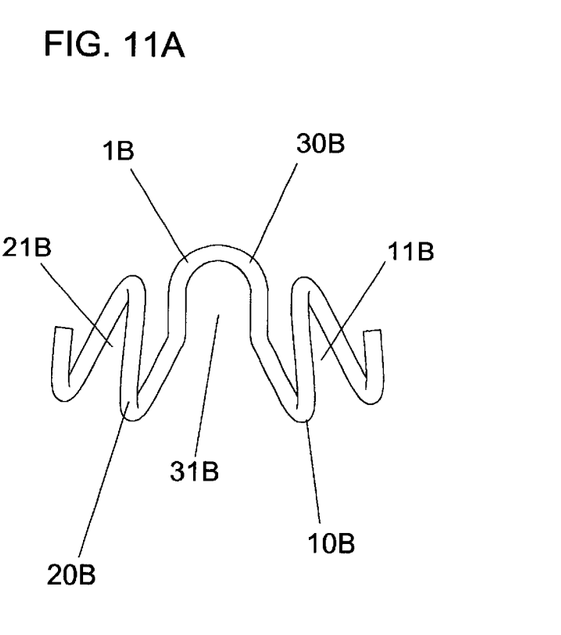

FIGS. 10, 11, and 11A illustrate a second alternate embodiment pendant positioner 1B comprising a second alternate embodiment left hand coil 10B forming a second alternate embodiment left hand opening 11B, a second alternate embodiment locating section 30B which forms a second alternate embodiment locating loop opening 31B, and a second alternate embodiment right hand coil 20B forming a second alternate embodiment right hand opening 21B.

In FIG. 10 said pendant positioner 1B is shown with said necklace 100 contained within said coils 10B and 20B with said locating section 30B containing a type two bail 201 with the type two pendant 202, said locating section 30B in conjunction with said coils 10B and 20B serving to retain said pendant 202 in position on said necklace 100.

In the preferred embodiment, in use, one can place the necklace 100 through either of said coils 10 or 20 and then the other of said coils 10 or 20, the necklace 100 then being entwined within the pendant positioner 1 to the same end as inserting the necklace 100 through said coils 10 and 20.

Referring to FIG. 7, in use, a wearer would place the necklace 100 through the center of the left hand coil 10. Then, the wearer would position the type one bail 101 around the locating section 30 and pass the necklace 100 through the type one bail 101 and then place the necklace 100 through the right hand coil 20 and a necklace clasp (not shown) would fasten the necklace 100 into a closed loop. Thus positioned, the coils 10 and 20 will tend to restrict the pendant 202 from sliding on the necklace 100, also the locating section 30 will tend to hold the pendant in an appropriate position for display. This works best on small diameter very flexible necklaces where the axes of the left hand coil 10 and the right hand coil 20 are at an acute angle to each other.

Figure 12:
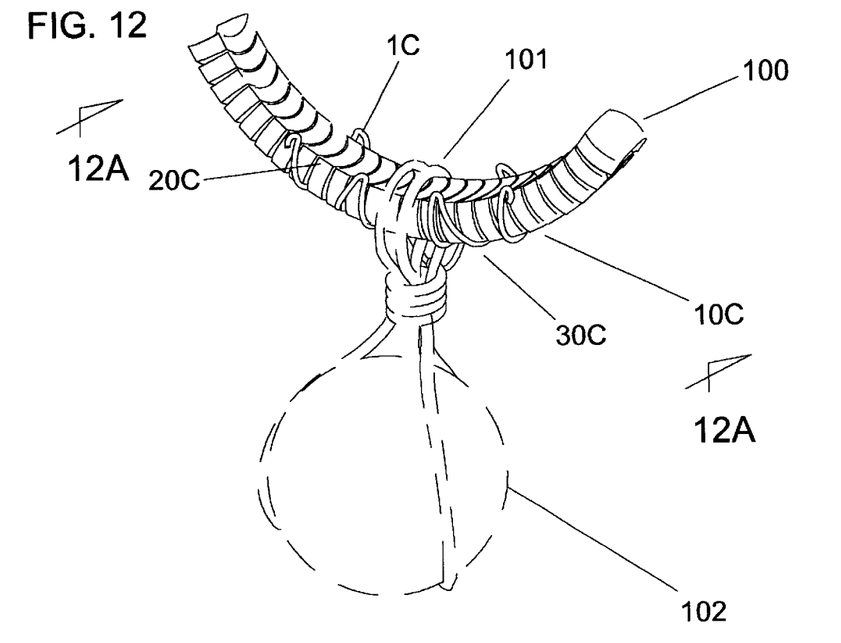
FIGS. 12, 12A, and 13 illustrate a third alternate embodiment of the present invention.
Figures 12A, 13:
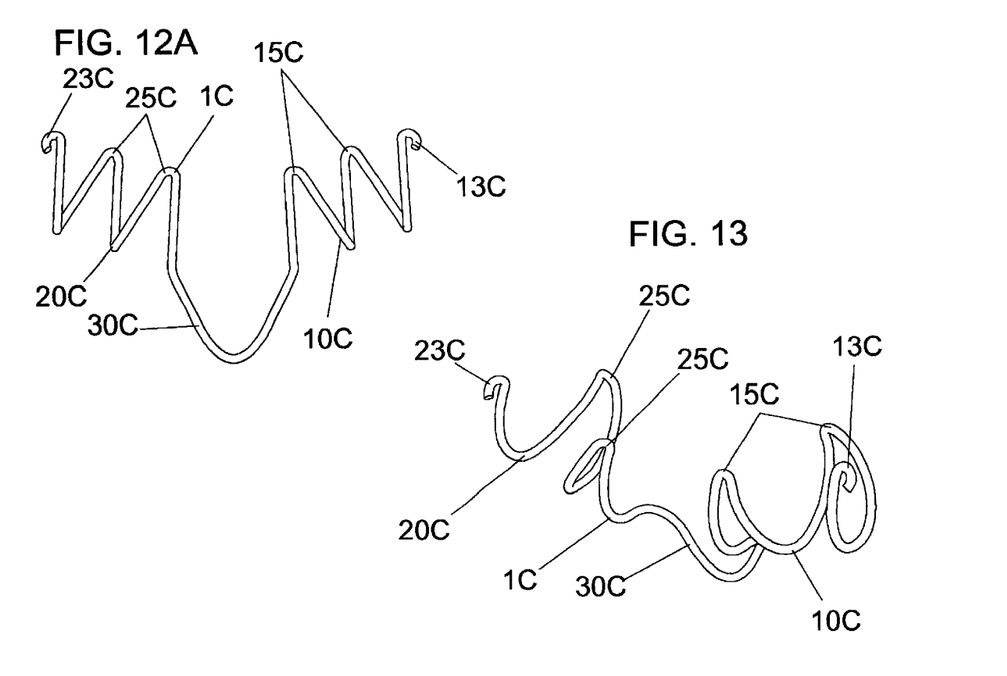

FIGS. 12, 12A, and 13, illustrate a third alternate embodiment pendant positioner 1C comprising a third alternate embodiment left hand coil 10C, a third alternate embodiment right hand coil 20C, a third alternate embodiment locating section 30C, a third alternate embodiment left bent end 13C, and a third alternate embodiment right bent end 23C, wherein said coils 10C and 20C further comprise the respective bends 15C and 25C.

Figure 1:
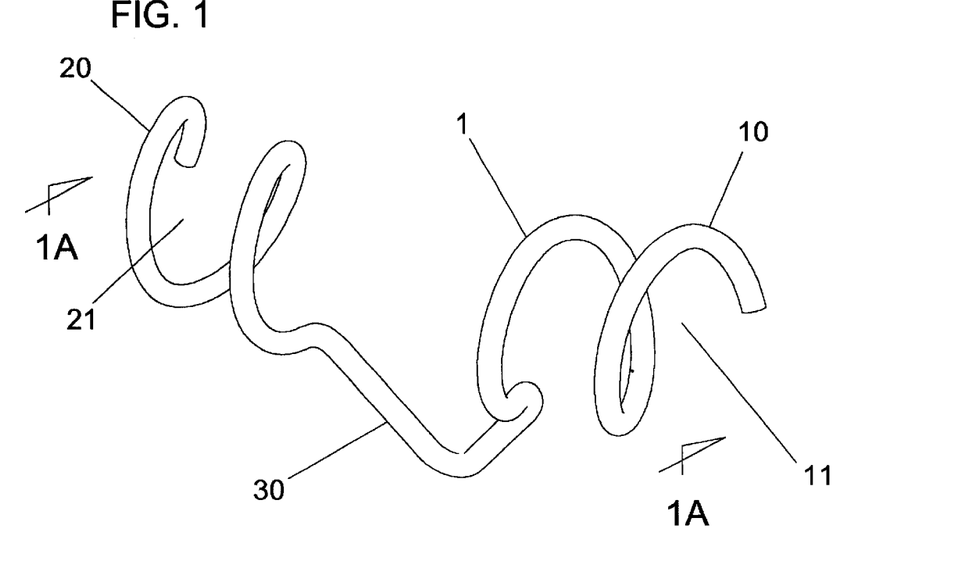
FIGS. 1 and 1A are views of the preferred embodiment of the present invention.
Figure 1A:
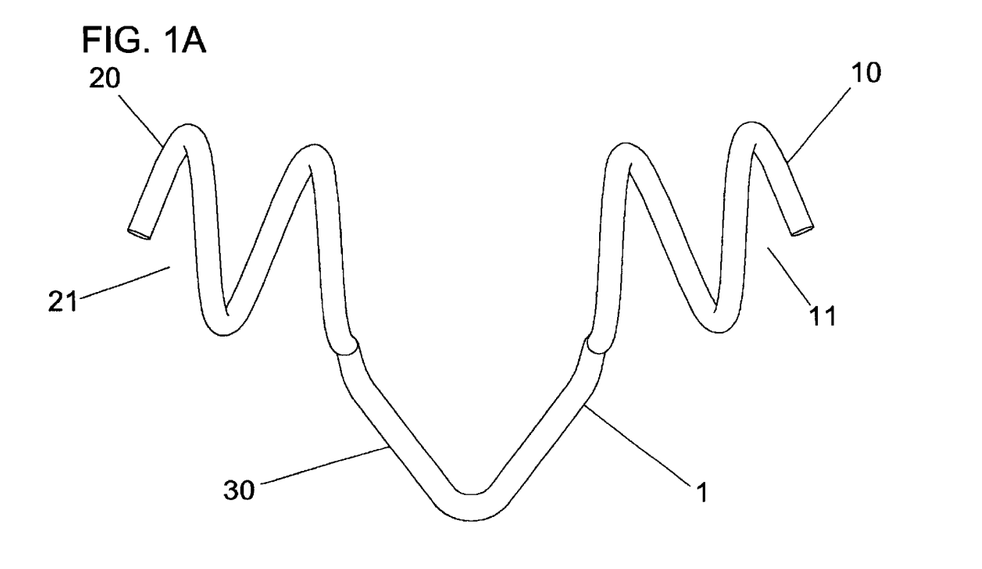

Said coils 10C and 20C are shown with a zigzag configuration as opposed to a spiral configuration previously shown in FIGS. 1 and 2 for said coils 10 and 20.

Said necklace 100, with said pendant 102, with said bail 101, is shown placed through said coils 10C and 20C of said pendant positioner 1C wherein said pendant 102 is being held in position on said necklace 100 by said coils 10C, 20C, and said locating section 30C.

Figure 14:
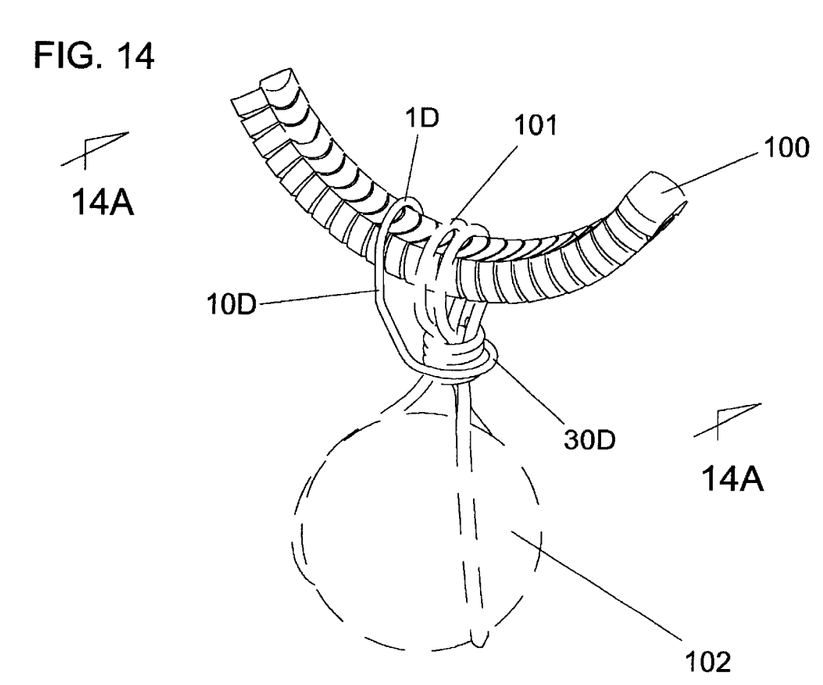
FIGS. 14, 14A, and 15 illustrate a fourth alternate embodiment of the present invention.
Figure 14A:
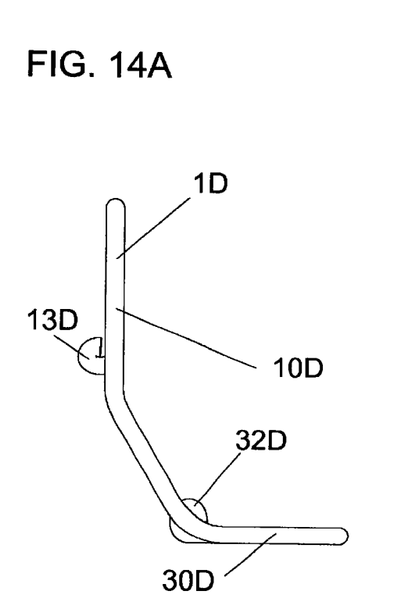
Figure 15:
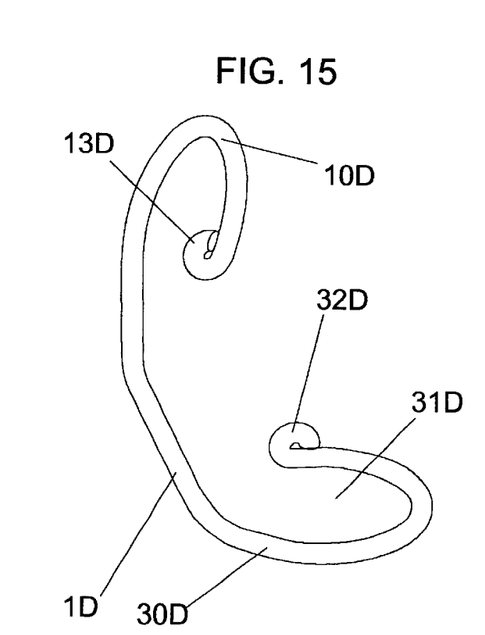

FIGS. 14, 14A, and 15 illustrate a fourth alternate embodiment pendant positioner 1D comprising a fourth alternate embodiment coil 10D with fourth alternate embodiment bent end 13D, a fourth alternate embodiment locating section 30D with a bent end 32D, said locating section 30D forming a fourth alternate locating loop opening 31D.

Said necklace 100, with said bail 101 and said pendant 102, is shown placed through said coil 10D of said pendant positioner 1D wherein said pendant 102 is being held in position on said necklace 100 by said coil 10D and by said locating section 30D against sliding on said necklace 100.

Figure 16:
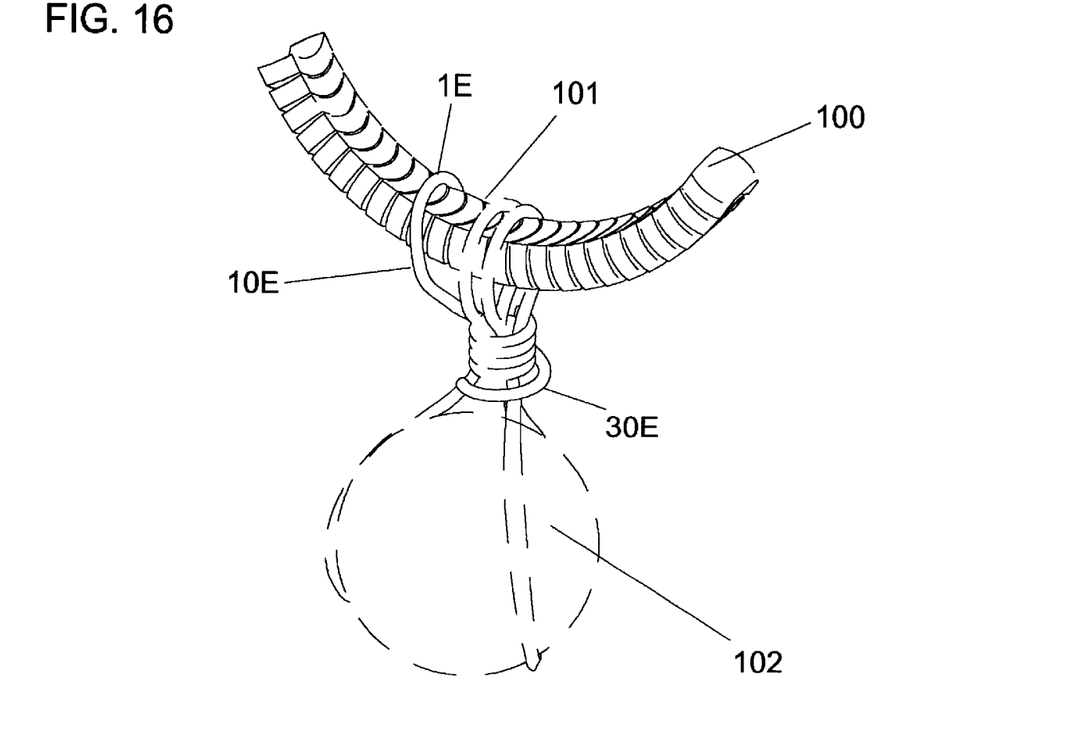
FIGS. 16 and 17 illustrate a fifth alternate embodiment of the present invention.
Figure 17:
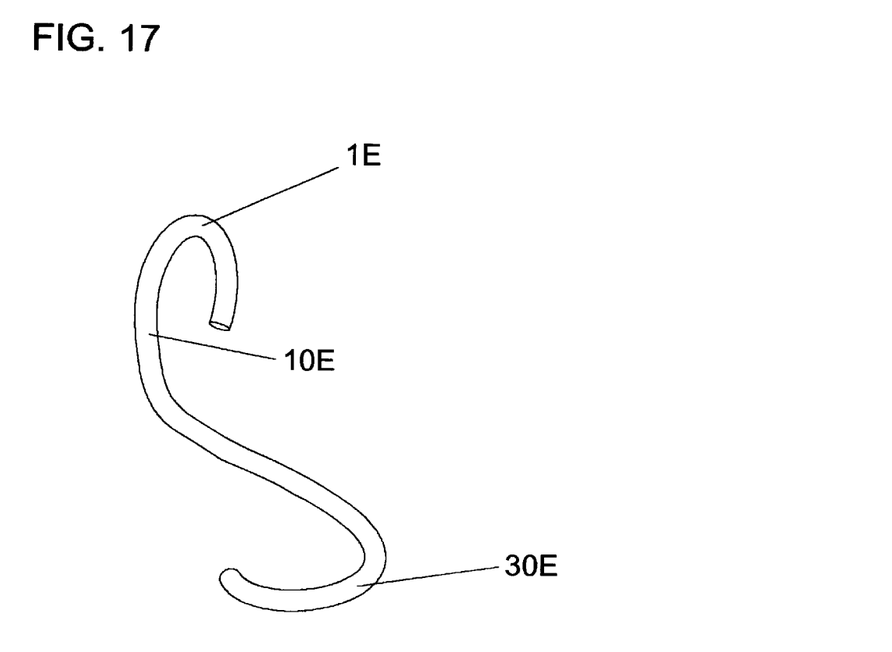

FIGS. 16 and 17 illustrate a fifth alternate embodiment pendant positioner 1E comprising a fifth alternate embodiment coil 10E with a fifth alternate embodiment locating section 30E.

Said necklace 100, with said bail 101 and said pendant 102, is shown placed through said coil 10E of said pendant positioner 1E wherein said pendant 102 is being held in position on said necklace 100 by said coil 10E and by said locating section 30E against sliding on said necklace 100.

Figure 18:
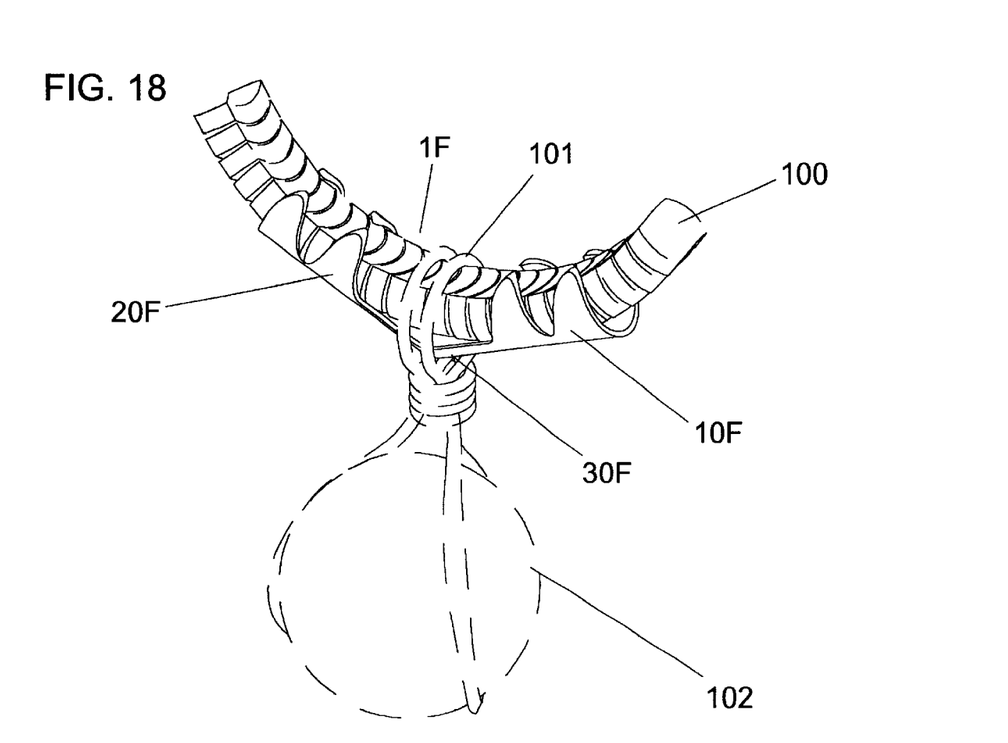
FIGS. 18 and 19 illustrate a sixth alternate embodiment of the present invention.
Figure 19:
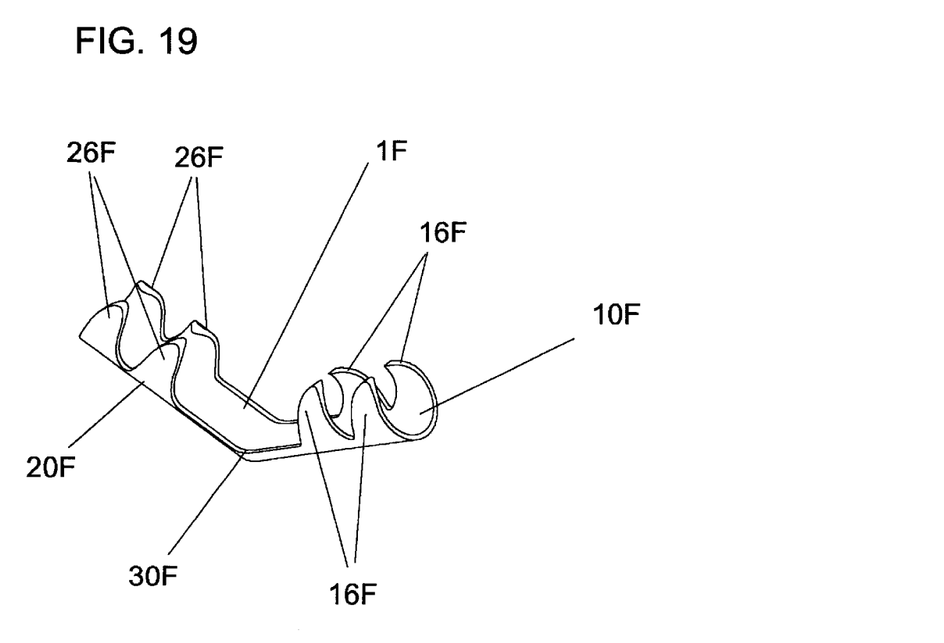

FIGS. 18 and 19 illustrate a sixth alternate embodiment pendant positioner 1F comprising a sixth alternate embodiment left hand coil 10F, a sixth alternate embodiment right hand coil 20F, and a sixth alternate embodiment locating section 30F. Said coils 10F and 20F are shown with respective rings 16F and 26F.

Said necklace 100, with said bail 101 and said pendant 102, is shown placed through said coils 10F and 20F wherein said pendant 102 is being held in position on said necklace 100 by said coils 10F and 20F and by said locating section 30F against sliding on said necklace 100.

Figure 20:
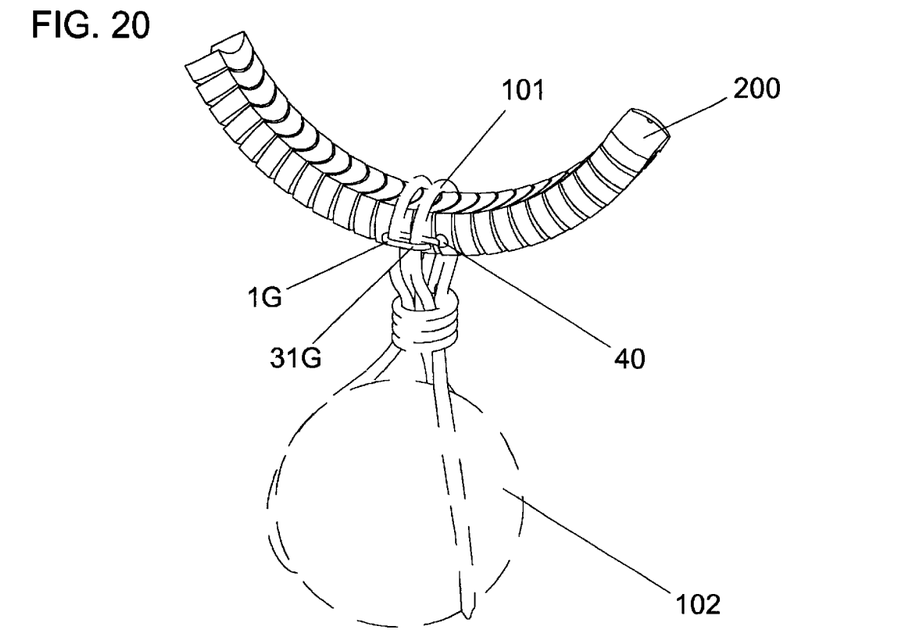
FIG. 20 illustrates a seventh alternate embodiment of the present invention as a component of a necklace.

FIG. 20 illustrates a seventh alternate embodiment pendant positioner 1G comprising a second alternate embodiment locating loop 31G connected as a component of necklace 200 by solder blob 40. However, as will be obvious to anyone skilled in the art, solder blob 40 could be replaced by any means of attachment to necklace 200, such as, but not restricted to, welding or bolting or other means of attachment.

Said pendant 102, with said bail 101, is shown with said bail 101 partially contained in second alternate embodiment locating loop 31G wherein said pendant 102 is being held in position on said necklace by said second alternate embodiment locating loop 31G against sliding on said necklace 200.

Figure 21:
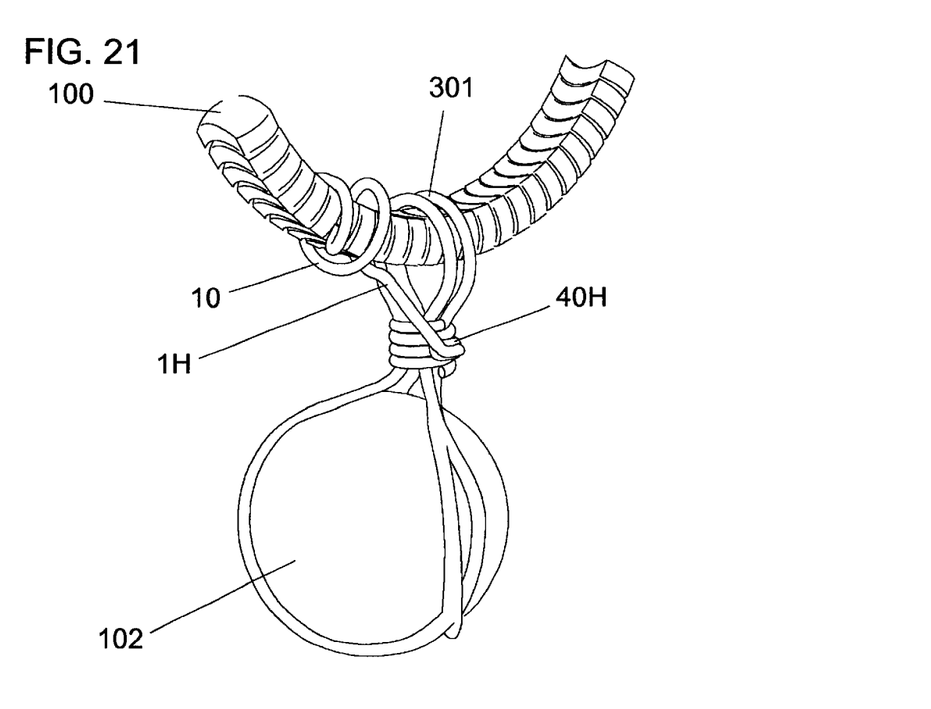
FIG. 21 illustrates an eighth alternate embodiment of the present invention as a component of a bail.

FIG. 21 illustrates an eighth alternate embodiment pendant positioner 1H comprising a coil 10 connected as a component of type three bail 301 by solder blob 40H. However, as will be obvious to anyone skilled in the art, solder blob 40H could be replaced by any means of attachment to type three bail 301, such as, but not restricted to, welding or bolting or other means of attachment.

Said necklace 100, with said pendant 102 and said bail 301 with said coil 10, is shown with said necklace 100 contained in said coil 10 wherein said pendant 102 is being held in position on said necklace 100 by said coil 10 against sliding on said necklace 100.

For best results in using the present invention the coils should be matched in size, flexibility, springiness, and other characteristics so that their contact with the carrier provides sufficient friction to keep the invention and loose object in position on the carrier under normal use conditions. Said friction may be accomplished by one or more of the following: a springy coil with an average inner diameter less than the average diameter of the carrier, a rigid coil of smaller inside diameter than the average diameter of a flexible carrier winding through the coil, the locating section of the device being springy and the angle between the axes of left and right coils being different than the converging angle of the carrier from opposite sides of the bail, a roughness of, or coating on, either the coil or the carrier, bent or formed ends on the coil, an adhesive, a relatively enlarged diameter section of carrier, a springy carrier, wrapping a relatively soft and flexible but generally non-springy portion of the device around the carrier, crimping, clamping, clipping, or other common means of providing friction.

In the preferred embodiment of the present invention, the preferred material of construction is a metal wire, with some spring, bent to shape. However, as is obvious to anyone skilled in the art, other materials, for example plastic or a shape memory material such as Nitinol, or other methods of construction would serve the purpose, but perhaps not as well.

For a nearly invisible relatively small pendant positioner 1, a fine wire with an approximate diameter of 0.006/0.007 inches works well as a best mode embodiment.

Said pendant positioner 1 may be plated or coated with additional metals or materials for best decorative effect in its desired application. An example would be gold plating for use with a gold necklace.

Said pendant positioner 1 may be magnetic to facilitate recovery when accidently dropped. As a best mode disclosure, in the preferred embodiment, 302 stainless steel wire has been found to have desirable springy, magnetic, platability, and other characteristics.

It will be obvious to those skilled in the art that modifications may be made to the embodiments described above without departing from the scope of the present invention.

For example, said coils 10, 10A, 10B, 10C, 10D, 10E, 10F, 20, 20B, and 20F need not be circular, or even uniform, but can be of a variety of shapes, such as, but not restricted to, oval, rectangular, or even triangular, as is obvious to anyone skilled in the art.

Also, in the embodiments illustrated with two spiral coils, the illustrations show coils with opposite handed spirals. However, the coils may also have same handed spirals.

Pendant positioners may have both spiral and zigzag coils. A coil may have any combination of spiral, zigzag, or ring portions.

Also, a coil can be defined as a ring. Furthermore, a coil may only be a partial ring, greater than a half circle.

Also, a coil of multiple turns may have a varying pitch. In fact, a decreasing pitch approaching the end 12 of the coil 10, as a specific example, or any of the ends of the aforementioned coils, as a general example, is advantageous in that it helps contain the necklace 100.

As a best mode disclosure, in the preferred embodiment, for a smaller size pendant positioner 1, the pitch should be the same as or slightly greater than the diameter of said opening 11 while for a larger size pendant positioner 1, the pitch should be somewhat less than the diameter of said opening 11.

Also, said bent ends 13, 13C, 13D, 14, 14A, 23, 23C, 24, and 32D can be perpendicular, parallel, or any intermediate angle with respect to said necklace 100.

The preferred embodiment would be for said ends 13, 13C, 13D, 14, 14A, 23, 24, and 32D to be at an angle such that they encroach their respective openings such as 11, 11A, 21, and 31D.

Furthermore, while the preferred embodiment is illustrated with a material with a circular cross-section, as is obvious to anyone skilled in the art, materials with other cross-sections can be used. In fact, wire with a non-circular cross-section may be easier to form into the device because it can be more easily held without twisting.

Also, as will be obvious to anyone skilled in the art, the present invention, which may also be considered a retaining member, may be, as a whole or separated into its component parts, affixed to either the carrier or the loose object. For example, one or more coils may simply be soldered to the loose object which may also be considered a hanging member which also includes pendants. Additionally the carrier, which can be considered an elongated member, and a locating section with a locating loop, or at least a locating loop, can be affixed to said elongated member. These embodiments are not among the preferred embodiments because they respectively limit the user to only elongated members that fit the affixed one or more coils or hanging members that fit the affixed locating loop.

It will also be obvious to anyone skilled in the art that other methods of use are possible, such as passing only the locating section 30 through said bail 101, but not passing said necklace 100 through said bail 101, or using said locating loop 31A to engage only a portion of said bail 101 or 201.

Additionally, a bail can be considered to include any aperture in a loose object. Also, a closed carrier, such as a necklace with its clasp fastened, can be considered endless. Pendants can include, but are not limited to, lockets, beads, pearls, rings, charms, crosses, mounted stones, mounted gems, and the like with an aperture which a necklace or similar ornamental device can pass through regardless of whether said aperture is in a bail or not. Multiple loose objects, such as pendants, can be held in different positions on a carrier, such as a necklace, by using one or more pendant positioners.

It is not the intention of the applicant to restrict this invention to carriers such as necklaces and loose objects such as pendants, as it is also applicable to the positioning of different types of loose objects on carriers. One such example is for positioning one or more charms on a bracelet. Another example would be lanterns strung on a rope. Necklaces and bracelets are just two specific types of jewelry carriers which include all other body member encircling ornament devices or other ornamental chains, cords, strings, strands and the like which may also be used with the present invention as will be obvious to anyone skilled in the art.

Thus the scope of the invention should be determined by the appended claims in the formal application and their legal equivalents, rather than by the examples given.

I claim:

1. An apparatus comprising:
    a jewelry carrier;
    a hanging member having an aperture, the jewelry carrier passing through the aperture such that the hanging member is in a slidable engagement with the jewelry carrier; and
    a retaining member having at least one coil forming an opening, the retaining member including a locating section;
    wherein the jewelry carrier is contained in the opening of the coil and the locating section of the retaining member secures the hanging member in a stationary position relative to the jewelry carrier.

2. The apparatus of claim 1 wherein said at least one coil further comprises a bent end.

3. The apparatus of claim 1 wherein said at least one coil further comprises a formed end.

4. The apparatus of claim 1 wherein said retaining member is magnetic.

5. The apparatus of claim 1 wherein said retaining member is springy.

6. The apparatus of claim 1 wherein said retaining member is made of a shape memory material.

7. The apparatus of claim 1 wherein said retaining member further comprises a locating loop which, in conjunction with said locating section, serves to retain said hanging member in position on said jewelry carrier.

8. A device comprising a coil with a means for frictionally engaging a jewelry carrier passing through said coil and a locating section that is not a loop of said coil with a means for engaging a pendant slidably placed on said carrier wherein said device keeps said device and said pendant from moving in either direction along said carrier.

9. The device of claim 8 wherein said coil further comprises a bent end.

10. The device of claim 8 wherein said coil further comprises a formed end.

11. The device of claim 8 wherein the device is magnetic.

12. The device of claim 8 further comprising a locating loop which, in conjunction with said locating section, serves to retain said pendant in position on said jewelry carrier.

13. A jewelry apparatus comprising:

a pendant with a bail, said bail slidably held on a jewelry carrier, a coil, said jewelry carrier placed through said coil, said coil including a locating loop opening, said pendant being located in said locating loop opening, and said coil having means to hold said coil and said opening against sliding on said jewelry carrier.

14. A jewelry apparatus comprising:

a hanging member and a jewelry carrier, the hanging member having an aperture, the jewelry carrier passing through the aperture such that the hanging member is in slidable engagement with the jewelry carrier, a retaining member comprising at least one coil forming an opening, the retaining member including a locating section, the jewelry carrier being disposed through the opening of said at least one coil of the retaining member, the locating section of the retaining member securing the hanging member in a stationary position relative to the jewelry carrier.

15. The jewelry apparatus of claim 14 wherein the retaining member further includes a locating loop which, in conjunction with said locating section, serves to retain said pendant in position on said jewelry carrier.

16. The jewelry apparatus of claim 14 wherein said at least one coil further comprises a formed end.

17. The jewelry apparatus of claim 14 wherein said at least one coil further comprises a bent end.

18. A jewelry apparatus comprising:

a) at least one coil;

b) a locating section;

c) a jewelry carrier; and d) a pendant with a bail;

wherein said pendant with a bail is slidably placed on said jewelry carrier;

wherein said jewelry carrier is placed through said at least one coil;

wherein said pendant with a bail being located in said locating section; and wherein said pendant with a bail being held in a stationary position on said jewelry carrier by the at least one coil and locating section.

19. The jewelry apparatus of claim 18 wherein said locating section separates said at least one coil into a left half and a right half.

20. A jewelry apparatus comprising:

a) an endless jewelry carrier;

b) a hanging member having an aperture; and c) said banging member including a frictionally engaging coil;

said jewelry carrier passing through the aperture;

whereby said frictionally engaging coil secures said hanging member in a stationary position relative to said jewelry carrier.

\* \* \* \* \*